United States Patent Office 2,886,067
Patented May 12, 1959

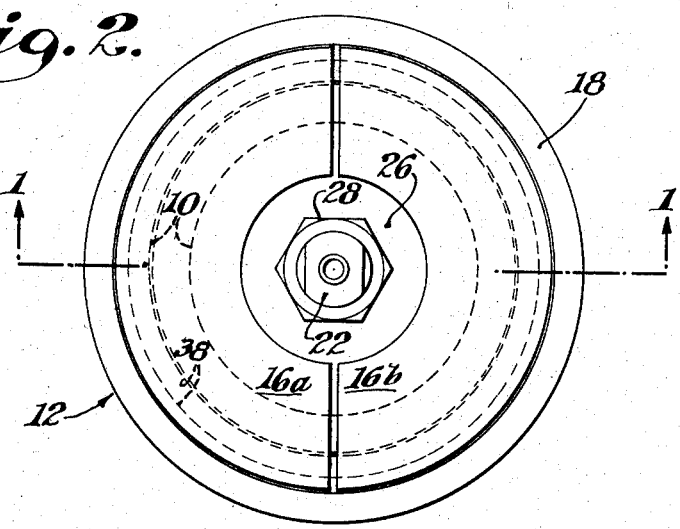
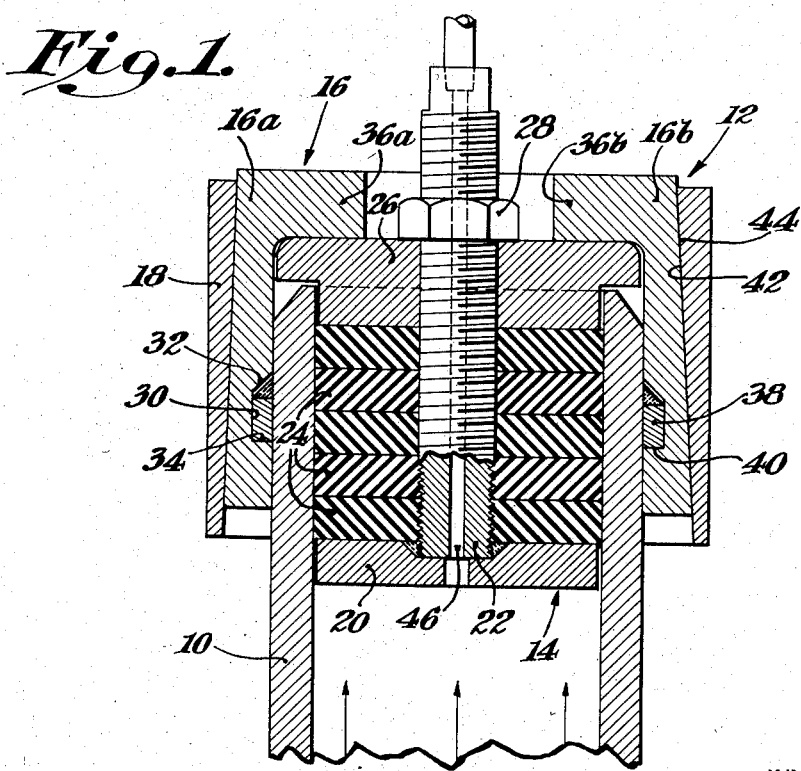

2,886,067

PIPE TESTING PLUG

Carl A. Maxwell, Darien, Conn., and Ralph W. Parrish, Honesdale, Pa., assignors to The Lummus Company, New York, N.Y., a corporation of Delaware Application July 22, 1957, Serial No. 673,348

1 Claim. (Cl. 138—90)

This invention relates to apparatus for pressure testing pipes or channels and more particularly relates to a pipe testing jig or test plug for sealing pipes or vessel openings during internal pressure tests.

It is the practice, upon completion of pipe sections or the fabrication of apparatus such as pressure vessels or heat exchangers, to apply a very high internal pressure to the same to hydrostatically test such apparatus prior to placing it into service. In the past, this has been accomplished by the use of heavy plates welded into the ends of the pipe section or pipe outlets and inlets, thereafter applying a hydrostatic pressure to the pipe section, vessel or exchanger by some convenient means to determine whether or not the apparatus has been properly fabricated. After completion of the test the plates or plugs must be removed by methods which frequently leave the pipe in an unsuitable condition for service. This is particularly true where the plug is burned out. Not only is there resulting harm to the pipe and associated apparatus during plug removal but such operation is very time consuming.

The primary object of the present invention is the provision of a pipe testing plug or testing jig which is easy to use, comparatively light in weight and relatively inexpensive.

A further object is to provide a pressure testing device which may be rapidly mounted and dismantled and which is simple and easy to operate, permitting very rapid testing.

A still further object of the invention is to provide a pipe testing plug or testing jig which may be rapidly mounted on straight pipes or nozzles and dismantled without damage to the pipe or nozzle.

Further objects and advantages of the invention will appear more fully from the following description, especially when taken in conjunction with the accompanying drawing which forms a part thereof.

In the drawings:

Figure 1 is a cross sectional elevation view of a testing device according to the invention in test position at the end of a pipe.

Figure 2 is a plan view of the testing device of Figure 1.

In the drawing, the reference numeral 10 indicates the end of a pipe or channel which may lead to or from apparatus which is to be subjected to high internal test pressures. The pressure testing jig, generally indicated at 12, comprises a plug arrangement 14, a segmented shear clamp 16 and a shear clamp sleeve or retaining ring 18. The plug arrangement 14 is comprised of a bottom or inner pressure plate 20 to which a clamping bolt 22 is centrally welded. Compressible sealing disks 24 of rubber, neoprene or other suitable material are provided with a central hole and are positioned on the inner plate 20 surrounding the bolt 22. A top or outer pressure plate 26 is likewise positioned on the bolt 22, retains the sealing disks 24 on the clamping bolt 22 and is initially secured in disk clamping position by nut 28. The shear clamp 16 is formed in two or more segments 16a and 16b and as shown surrounds the pipe 10. The shear clamp is provided with an internal circumferential shear resisting groove defined by an end wall 30 and radial rear and forward walls 32 and 34, respectively. Portion 36a and 36b of the shear clamp extends radially inwardly to partially cover outer plate 26 while providing access to nut 28. The shear clamp is restrained from outward movement by shear ring 38 which is welded to pipe 10. This shear ring is arranged on the pipe so that its forward radial face 40 is disposed opposite wall 34 of the shear clamp. The segments 16a and 16b of shear clamp 16 are retained in their shear position and are prevented from radial outward movement by shear clamp retaining ring 18 which is seated with its inner face 42 abutting outer face 44 of the shear clamp segments.

The bottom or inner plate 20 and clamping screw 22 of the plug assembly may be provided with a central pressure conduit 46 through which the testing fluid may enter and/or be withdrawn or through which the testing fluid may be applied to an external pressure indicating device (not shown).

In applying the testing device to a pipe or pressure nozzle to be treated the shear ring 38 is first welded or otherwise affixed to the outside surface of the pipe. A plug assembly 14 of appropriate outer diameter is inserted into the pipe or nozzle and plates 20 and 26 are drawn together by tightening nut 28 on clamping bolt 22 thereby causing the compressible sealing disks to expand radially outward. When the plates have been drawn together sufficiently to cause disks 24 to tightly grip the inner surface of the pipe the segmented shear clamp 16 is positioned whereby outer plate 26 is restrained from outward movement. The shear clamp sleeve or locking ring 18 is next slipped around the shear clamp to restrain radially outward movement thereof. The testing jig is then in test position and test fluid may be introduced into the pipe and/or adjacent apparatus. As the pressure increases within pipe 10 the resultant increasing compression forces move plate 20 toward restrained plate 26 causing proportionally increased radial expansion of the compressible sealing disks with a consequent tighter seal formed between the plug and the pipe or nozzle wall.

The simple mechanical apparatus provided by the present invention is designed to replace more cumbersome methods and assortments of equipment heretofore used in performing such testing operations and provides for more rapid and efficient testing. Further, the testing jig provided does not deform or damage the internal surface of the pipe or nozzle to which it is clamped and is particularly applicable to straight pipes or nozzles which are not provided with flanges.

Testing devices of the type disclosed have been successfully applied to pipes and nozzles having an internal diameter of twelve (12) or more inches wherein it was desired to apply a pressure of 6000 p.s.i. or more.

It will be understood that various changes and modifications may be made in the construction as shown in the embodiment illustrated without departing from the spirit and scope of the invention which is only to be limited by the terms of the appended claim.

We claim:

In combination with a pipe or the like to be pressure tested, a pipe sealing device including: plug means extending into said pipe in axial alignment therewith and comprising at least one compressible and radially expandable resilient sealing gasket positioned between inner and outer pressure plates and bolting means including a shank affixed at one end to said inner plate and extending through said gasket and said outer plate and tightening means on said shank whereby said gasket is compressed between said plates and radially expanded so as to engage the internal wall of said pipe, said gasket and said inner plate having peripheral configurations substantially corresponding to the configuration of the inner wall of said pipe, said outer plate including an inner portion adjacent said gasket having a peripheral configuration substantially corresponding to the configuration of the internal wall of said pipe and an outer portion including an annular shoulder projecting beyond the internal wall of said pipe and overlaying the end thereof whereby said outer plate is restrained from complete insertion within said pipe; a segmented annular plug clamp closely surrounding said pipe and having an internal circumferential shear resisting groove engaging an annular shear ring mechanically affixed to the external wall of said pipe and a radial inwardly projecting shoulder portion overlaying the annular shoulder of said outer plate whereby said outer plate is clamped to the end of said pipe and said plug means is restrained from outward movement during the application of an internal pressure to said pipe; and a clamp retaining sleeve surrounding the segments of said annular plug clamp for maintaining the clamp segments in plug clamping relationship to said pipe.

References Cited in the file of this patent
UNITED STATES PATENTS

| | | |
|---|---|---|
| 1,904,340 | Wright | Apr. 18, 1933 |
| 2,155,491 | Jacobs | Apr. 25, 1939 |
| 2,659,511 | Rice | Nov. 17, 1953 |
| 2,763,293 | Kruck | Sept. 18, 1956 |